US00RE42910E

(19) United States
(12) Reissued Patent
Pearce

(10) Patent Number: US RE42,910 E
(45) Date of Reissued Patent: Nov. 15, 2011

(54) VENTING CAP

(75) Inventor: Woodrow W. Pearce, Glendale, CA (US)

(73) Assignee: Innovation Update, LLC, Pasadena, CA (US)

( * ) Notice: This patent is subject to a terminal disclaimer.

(21) Appl. No.: 09/995,483

(22) Filed: Nov. 28, 2001

Related U.S. Patent Documents

Reissue of:
(64) Patent No.: 6,202,870
Issued: Mar. 20, 2001
Appl. No.: 09/277,918
Filed: Mar. 29, 1999

(51) Int. Cl.
*B65D 51/16* (2006.01)
*B65D 41/04* (2006.01)
*B65D 53/00* (2006.01)

(52) U.S. Cl. ..... 215/307; 215/310; 215/902; 215/341; 215/343; 215/344; 215/349; 220/367.1; 220/810

(58) Field of Classification Search ..... 215/329, 215/902, 307, 349, 348, 343, 341, 344, 235, 215/237, 310; 222/534, 556; 220/367.1, 220/810, 820, 837
See application file for complete search history.

(56) References Cited

U.S. PATENT DOCUMENTS 1,724,346 A * 8/1929 Ford ..... 220/303
2,162,455 A 6/1939 Hoge
2,608,841 A 9/1952 Rice
2,739,724 A * 3/1956 Gora ..... 215/307
2,790,570 A * 4/1957 Hodges et al. ..... 215/260
3,045,854 A * 7/1962 Patton ..... 215/260
3,100,577 A * 8/1963 Miller, Jr. et al. ..... 215/261
3,147,876 A * 9/1964 Lepore ..... 215/261
3,174,641 A * 3/1965 Kitterman ..... 215/260

(Continued)

FOREIGN PATENT DOCUMENTS

CA 721124 11/1965

(Continued)

OTHER PUBLICATIONS

Closures & Containers Magazine, A Look At Venting, pp. 14-15.

(Continued)

*Primary Examiner* — Robin Hylton
(74) *Attorney, Agent, or Firm* — Christie, Parker & Hale, LLP

(57) ABSTRACT

A bottle cap is provided that allows for venting of gases generated in a bottle. A single or multiple ridges are formed on the inner surface of the cap top such that the ridges sit on the bottle mouth rim when the cap is threaded onto the bottle. A single or multiple slots may be formed across each of the ridges. Alternatively, a single or multiple grooves may be formed on the inner surface of the cap top. The ridge(s) or groove(s) may also be formed on a disc fitted over the inner surface of the cap top. When the cap is threaded on to the bottle, gases generated in the bottle can escape through the slot(s) formed across the ridge(s) or through the groove(s) formed on the inner surface of the cap top. A liner having an opening formed through its thickness may be placed in the cap. The liner opening allows the passage of gases from the bottle to the slot(s) or groove(s) formed on the cap top or disc.

21 Claims, 8 Drawing Sheets

U.S. PATENT DOCUMENTS

| | | | | | |
|---|---|---|---|---|---|
| 3,589,545 | A | | 6/1971 | Carpenter, Jr. | |
| 3,628,704 | A | * | 12/1971 | Corsette | 222/513 |
| 3,696,958 | A | | 10/1972 | Lee | |
| 3,704,677 | A | * | 12/1972 | Moller | 413/4 |
| 3,717,276 | A | | 2/1973 | Luczak et al. | |
| 3,944,104 | A | | 3/1976 | Watson et al. | |
| 3,963,845 | A | * | 6/1976 | Dukess | 428/66.4 |
| 3,976,216 | A | | 8/1976 | Lambert | |
| 4,036,386 | A | * | 7/1977 | Nishioka et al. | 215/260 |
| 4,121,728 | A | | 10/1978 | Tagalakis et al. | |
| 4,165,816 | A | * | 8/1979 | Tupper | 220/203.14 |
| 4,190,170 | A | | 2/1980 | Boyd | |
| 4,351,443 | A | * | 9/1982 | Uhlig | 215/216 |
| 4,560,077 | A | * | 12/1985 | Dutt | 215/307 |
| 4,598,835 | A | | 7/1986 | Brownbill | |
| 4,789,074 | A | | 12/1988 | Han | |
| 4,880,127 | A | | 11/1989 | Doi | |
| 4,896,781 | A | * | 1/1990 | Simard | 215/328 |
| 5,152,419 | A | | 10/1992 | Yanagi | |
| 5,257,708 | A | | 11/1993 | Dubach | |
| 5,460,763 | A | | 10/1995 | Asai | |
| 5,542,585 | A | | 8/1996 | Peters et al. | |
| 5,730,306 | A | | 3/1998 | Costa et al. | |
| 5,743,420 | A | | 4/1998 | Loffler et al. | |
| 5,785,196 | A | | 7/1998 | Montgomery | |
| 5,803,286 | A | | 9/1998 | Pfefferkorn et al. | |
| 5,830,594 | A | * | 11/1998 | Malay | 429/53 |
| 5,853,096 | A | | 12/1998 | Bartur et al. | |
| 5,961,010 | A | | 10/1999 | Smith | |
| 5,996,859 | A | | 12/1999 | Beck | |

FOREIGN PATENT DOCUMENTS

| | | | |
|---|---|---|---|
| DE | 27360 | | 8/1964 |
| FR | 1571958 | | 8/1964 |
| FR | 1424586 | | 12/1965 |
| GB | 586919 | | 4/1947 |
| JP | 7-96960 | * | 4/1995 |

OTHER PUBLICATIONS

Closures & Containers Magazine, The Need for Vented Closures, Jan./Feb. 1996, 2 Pages.

Closures & Containers Magazine, "A Look At Venting," date unknown, pp. 14-15.

* cited by examiner

*FIG. 15*
AMENDED
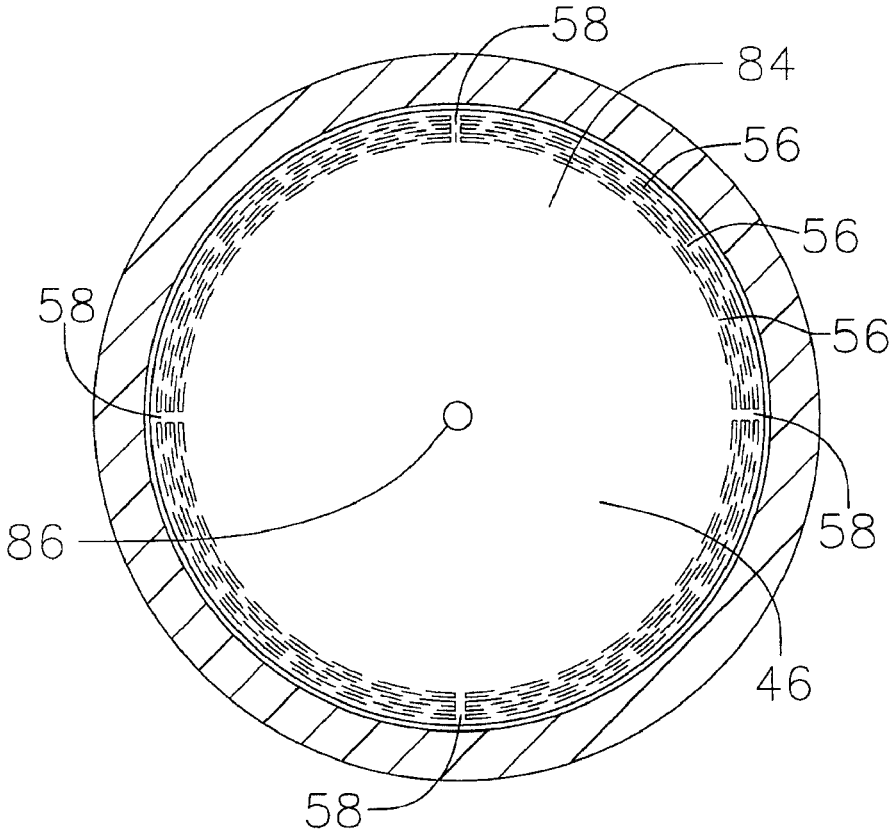

VENTING CAP

Matter enclosed in heavy brackets [ ] appears in the original patent but forms no part of this reissue specification; matter printed in italics indicates the additions made by reissue.

*CROSS REFERENCE TO RELATED APPLICATIONS*

*Notice:*

*More than one re-issue application has been filed for the U.S. Pat. No. 6,202,870. The re-issue applications are Re-Issue application Ser. No. 09/995,483 (the present application), and a divisional application being filed on Jan. 24, 2004, off of the present application.*

BACKGROUND OF THE INVENTION

This invention relates to bottle caps which when screwed on a bottle allow for the venting of gases generated in the bottle.

Shampoos, cold creams and other cosmetics are typically prepared under heat and are poured into plastic containers such as bottles usually while still hot. The plastic bottles containing the hot cosmetic material are capped, trapping the hot gases generated by the hot cosmetics. When capped, a lower or inner surface 10 of the cap top seats against the mouth 12 of the bottle 14 forming a seal (FIG. 1). Consequently, if capped immediately after filling, the gases generated by the hot cosmetics generate a pressure within the bottle. The hot pressurized gases cause the plastic bottle to form flat spots. This condition is commonly referred to as "bottle paneling." Moreover, the increase in pressure within the bottle may cause the bottles to explode creating a hazardous condition. One way to avoid pressure build-up and paneling is to fill the bottles while the cosmetics are cold. When cold, the cosmetics are thick and viscous, thus, having reduced fluidity. Consequently, the filling process is slowed requiring a longer time to fill the bottles.

A typical way of avoiding pressure build-up and paneling is to fill the bottles with the hot cosmetics and wait for a period of time, typically in the order of 24 hours, before capping the bottles. This approach also slows down the filling process adding to production costs.

Another common way of preventing bottle paneling, incorporates a grooved liner fitted into the bottle cap. The liner typically has a surface that has grooves forming a cross-hatched pattern as well as holes penetrating its thickness. The bottom surface of the liner is covered with a gas permeable layer. When fitted into the cap, the grooved surface of the liner is mated to the lower surface of the cap top. When the cap is screwed onto the bottle, the holes provide a path for gas generated within the bottle to travel to the grooves which provide a path to the inner circumference of the cap from where the gas can escape through the space created between the cap rim and the bottle neck to the exterior of the bottle.

Thus, there is a need for a fail safe bottle cap that would allow for venting of gases generated in a bottle so as to allow for the capping of bottles immediately after being filled with hot liquids.

SUMMARY OF THE INVENTION

A bottle cap is provided which when screwed on to a bottle provides a path for gases generated in the bottle to escape from the bottle through a spiraling space formed in the threaded region between the inner surface of the bottle cap rim and the outer surface of the bottle neck.

The bottle cap includes one or a plurality of concentric preferably circular ridges formed on the inner surface of the cap top. Each of these ridges is designed to sit on the rim of the bottle mouth when the cap is threaded onto the bottle neck. A slot or multiple slots are formed in each ridge. The slots between adjacent ridges may be staggered or may be aligned.

In an alternate embodiment, grooves are formed on the inner surface of the cap top. When the bottle cap is threaded onto the bottle neck, the grooves extend from a location on the inner surface of the cap top within the mouth of the bottle neck to a location extending to the outer edge of the mouth rim or beyond the mouth rim of the bottle neck.

With every embodiment, when the cap is threaded onto the bottle, gases generated within the bottle can escape across the rim of the mouth of the bottle neck through the slots or through the grooves and through the threaded region between the inner surface of the cap rim and the outer surface of the bottle neck to the exterior of the bottle.

In an alternate embodiment, the ridges or grooves are formed on a disc which is fitted in the cap over the cap top inner surface. The disc may be glued on the cap inner surface.

A liner may also be used with the caps of the present invention. This liner is typically fitted over the inner surface of the cap top. An opening is formed in the liner to allow for gases generated in the bottle to penetrate the opening and escape through the slots or grooves formed on the cap top or disc.

DESCRIPTION OF THE DRAWINGS

FIG. 13 is a partial cross sectional view of a cap threaded onto a bottle neck and incorporating a disk having a ridge and a slot there through.

*FIG. 15 is a partial cross-sectional bottom view of a cap according to FIG. 4 with the liner shown in FIG. 7.*

DETAILED DESCRIPTION OF THE INVENTION

Figure 2:
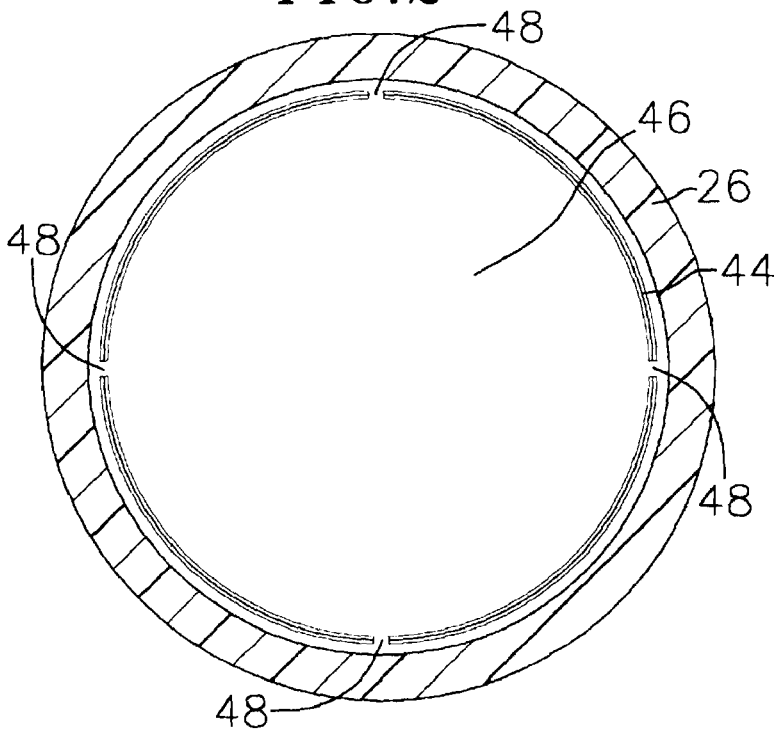
FIG. 2 is a partial cross-sectional bottom view of a cap of the present invention depicting a ridge formed on the inner surface of the cap top having slots formed therethrough.

A cap typically consists of a disc shaped top portion 24 from which extends an annular wall or rim 26 (FIG. 2). Threads 28 are formed on the inner surface 30 of the annular wall 26 for threading on threads 32 formed on the outer surface 34 of a bottle neck 36 (FIG. 3). The end of the bottle neck has a mouth 40 defined by a rim 42.

Figure 1:
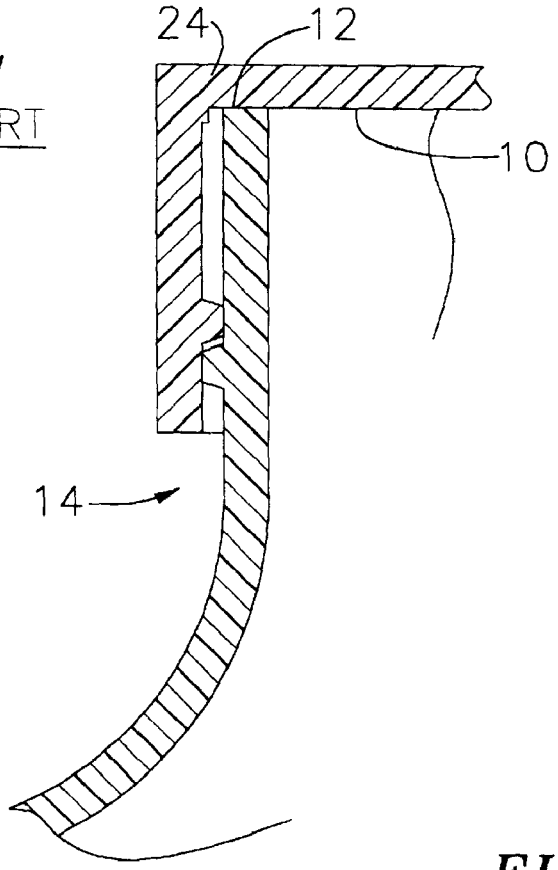
FIG. 1 PRIOR ART
FIG. 1 is a partial cross-sectional view of a typical cap threaded onto a bottle neck.
Figure 3B:
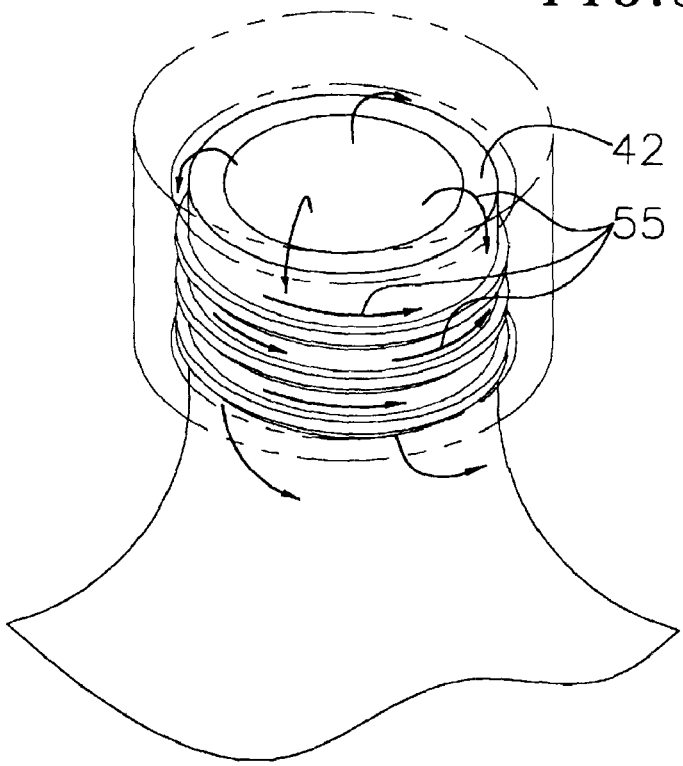
FIG. 3B is a perspective view depicting the flow of gases through the threaded space formed between the bottle neck outer surface and the cap inner surface.
Figure 3A:
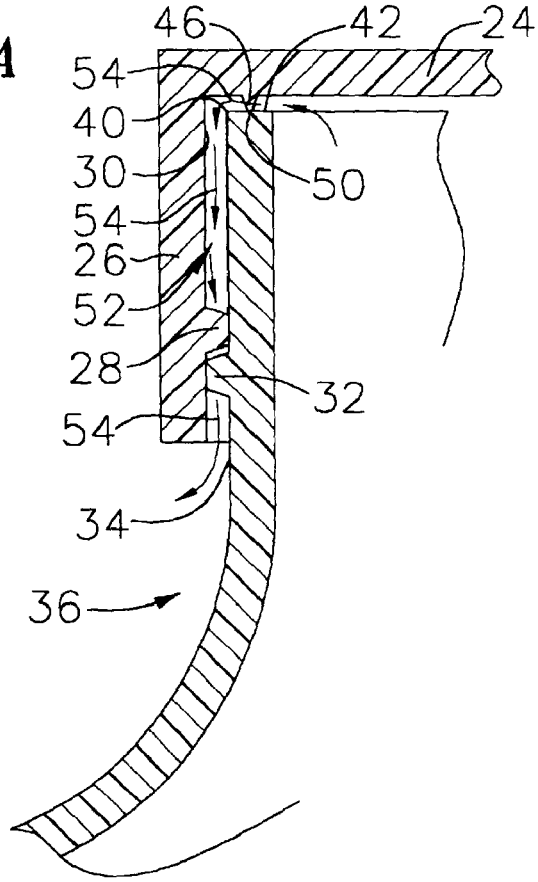
FIG. 3A is a partial cross-section of a cap of the present invention threaded on to a bottle neck.

In a first embodiment, the cap of the present invention includes a circular ridge 44 formed on the inner surface 46 of the cap top portion (FIG. 2). The circular ridge diameter is smaller than the outer diameter of bottle rim, but greater than the inner diameter of the bottle rim defining the mouth. In this regard, when the cap is threaded onto the bottle neck, the ridge 44 sits on the bottle neck rim 42 (FIG. 3A).

One or more slots 48 are formed radially across the ridge. If more than one slot is formed, preferably the slots are equidistantly spaced along the ridge circumference. Preferably, four slots are formed spaced at 90° intervals around the ridge.

When the cap is threaded onto the bottle, the ridge sits on the rim 42 of the bottle neck. A seal 50 is formed between the ridge and the bottle mouth. The slots, however, provide a path for gas to escape from the bottle through the slots and out through the threaded spiraling space 52 between the inner surface of the cap annular wall and the outer surface of the bottle neck as shown by arrows 54 (FIG. 3A) or arrows 55 (FIG. 3B).

Figure 4:
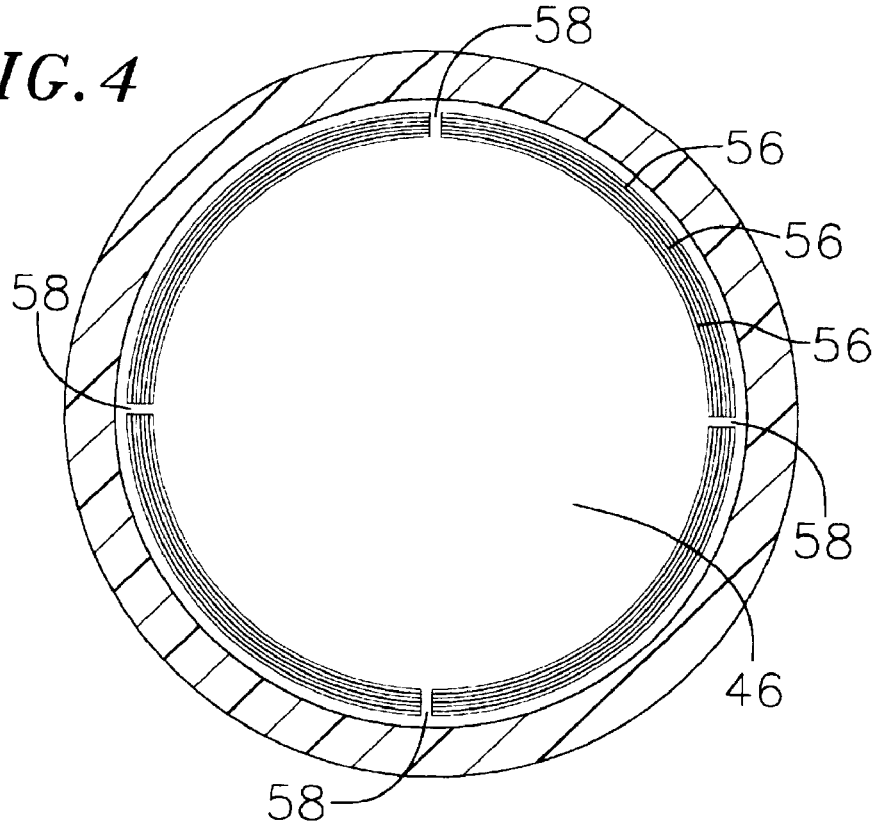
FIG. 4 is a partial cross-sectional bottom view of a cap of the present invention having multiple slotted concentric ridges formed on the inner surface of the cap top.

In an alternate embodiment, instead of a single ridge, multiple concentric spaced apart ridges 56 are formed (FIG. 4). Again, preferably each ridge should have a diameter that is smaller than the outer diameter of mouth of the bottle to be capped but greater than the inner diameter of the mouth of the bottle to be capped so that they can all mate with the bottle mouth rim 42 when the cap is threaded on to the bottle. At least a single slot 58 is formed radially across each of the ridges. If more than one slot is formed, preferably the slots would be equidistantly spaced around the concentric ridges. The concentric ridges provide multiple ridge surfaces for sealing with the bottle mouth rim, whereas each slot provides a path for venting to the outside.

Figure 5:
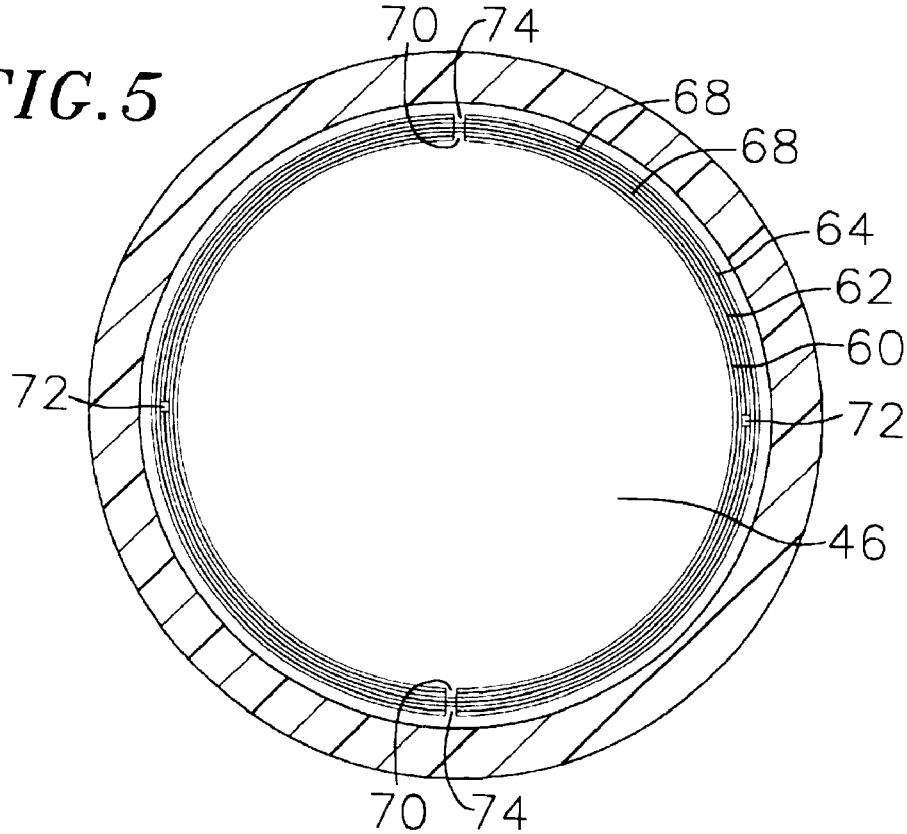
FIG. 5 is a partial cross-sectional bottom view of a cap of the present invention having multiple concentric ridges formed on the inner surface of the cap top having staggered slots formed therethrough.

In another embodiment, multiple concentric spaced apart ridges 60, 62, 64 are formed on the inner surface 46 of the cap top portion (FIG. 5). These ridges form grooves 68 between them. Again, these circular ridges have diameters such that they will sit on the rim 42 defining the mouth of the bottle neck when the cap is torqued onto the bottle. Staggered radial slots 70, 72, 74 are formed across the ridges. Preferably each slot is formed across a single ridge. At least one slot 70, but preferably two, are formed on the innermost ridge 60. When more than one slot is formed on a ridge, the slots should preferably be equidistantly spaced around the ridge. Similarly, one, or preferably two, slots 72 are formed on the ridge 62 immediately adjacent the innermost ridge 60. The slot or slots 72 should not be aligned with the slots 70 formed on the innermost ridge. If two slots 72 are formed, preferably, they are each located at a 180° from each other and spaced 90° away from slots 70 formed on the innermost ridge 60. One, or preferably two slots 74 are then formed on the next adjacent ridge 64. Preferably, these slots are aligned with the slots 70 formed on the inner most ridge 60. This pattern is preferably repeated until slots are formed on all the ridges formed on the cap top portion inner surface. Alternatively, the location of the slots on each ridge may be arbitrary or may be in any other preselected pattern. Moreover, each slot may span more than one ridge and/or the number of slots penetrating each ridge may be different from ridge to ridge.

When the cap is torqued onto the bottle neck, the ridges are seated on the rim 42 of the bottle neck forming a seal. The slots provide a path for gas to escape. Gas will first escape through the slots 70 formed on the innermost ridge 60 and travel in the groove 68 formed between the innermost ridge 60 and its adjacent ridge 62 until it reaches the slots 72 formed on the adjacent ridge 62 and then escapes through those slots. The gas then follows the various slot and groove paths until it exits through the threaded space 52 between the cap annular wall inner surface and the bottle neck outer surface.

Figure 6:
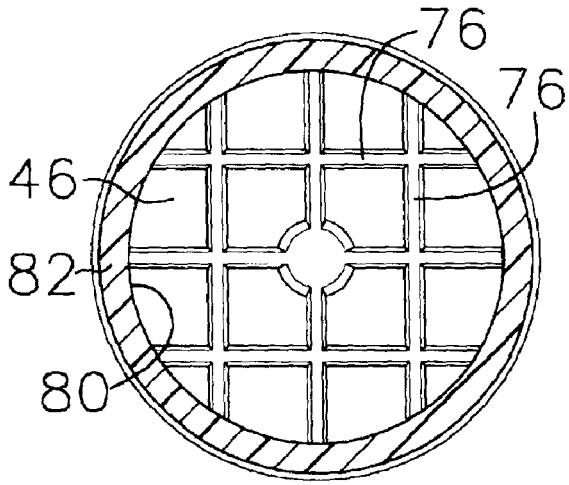
FIG. 6 is a partial cross-sectional bottom view of a cap of the present invention having grooves formed on the inner surface of the cap top.

In a further embodiment, grooves 76 may be formed on the inner surface 78 of the cap top portion inner surface 46 (FIG. 6). These grooves should preferably span to the edge 80 of the inner surface, i.e., the location where the inner surface of the cap top portion intersects the annular wall 82 of the cap, or span to at least a location at/or beyond the outer edge of the bottle neck rim 42 when the cap is torqued onto the bottle neck. Preferably, multiple chord-wise grooves are formed across the inner surface 46 of the cap top portion. The grooves may be parallel to each other and may also cris-cross each other. In the embodiment shown in FIG. 6, the grooves cris-cross each other forming squares. When the cap is torqued onto the bottle neck, the inner surface 46 of the cap top will seat against the rim 42 of the bottle neck. The inner surface 46 of the cap top portion will form a seal with the rim 42 of the bottle neck. The grooves 76, however, will provide a path for gasses formed in the bottle to escape across the rim of the bottle neck and through the threaded space 52 between the cap annular wall inner surface and the bottle neck.

The caps of the above described embodiments while allowing gas to vent would also allow some of the liquid to vent if the bottle were turned upside down and squeezed. When squeezed, the liquid material will travel through the slots formed on the ridges and in the later embodiment through the grooves 68. The liquid material would eventually gel in the slots and/or grooves sealing the slots and grooves. Thus, once the gas generated in the bottle has vented, the slots and/or grooves can be sealed by squeezing some of the liquid material through the slots or grooves as described above, thereby, preventing the escape of any further liquid from the capped bottle.

With all of these embodiments, the grooves, ridges and slots may be machined into the cap which is typically made of a hard plastic material. Alternatively, the grooves, ridges and slots may also be formed by a molding process. The cap with grooves, or ridges and slots may be formed by a single molding process. Alternative the grooves, or ridges and slots may be formed by a combination of molding and machining processes.

Because the grooves or ridges are made from the same hard plastic material as the cap, they are not susceptible to collapsing when under compression, as for example, when compressed against the rim 42 of the bottle mouth under normal cap torquing conditions.

Figure 7:
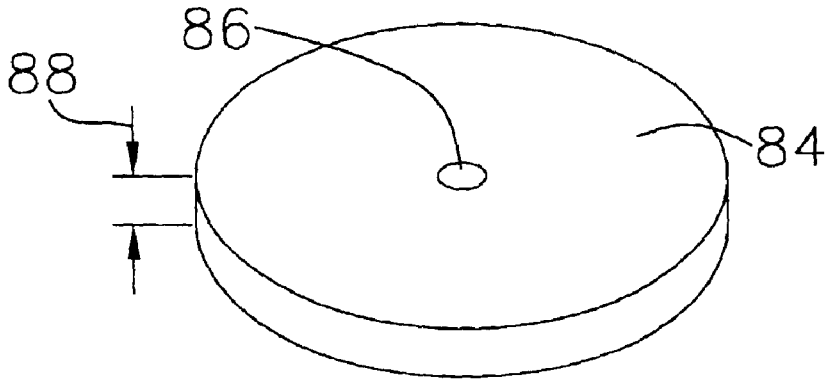
FIG. 7 is a perspective view of a liner for used with any of the caps of the present invention.

With any of the aforementioned caps, a liner 84 may be used if necessary (FIG. 7). Typically, the liner will sit against the ridges or the grooved inner surface of the cap top portion, *as for example shown in FIG. 15*. To allow for venting through the liner, at least a hole [80] *86* should be formed through the liner thickness 88. The hole should preferably have a diameter between about 0.010 to 0.015 inch. The liner thickness should preferably be between about 0.015 and 0.020 inch.

Figure 8:
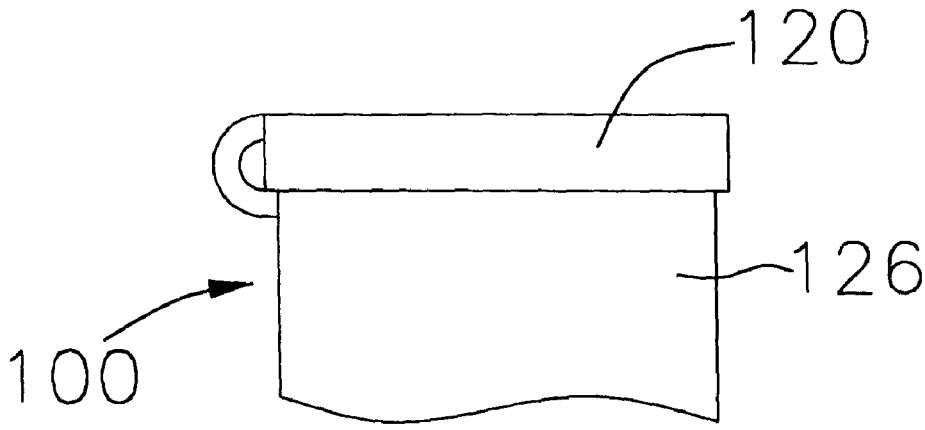
FIG. 8 is a side view of a cap having a flip top.
Figure 9:
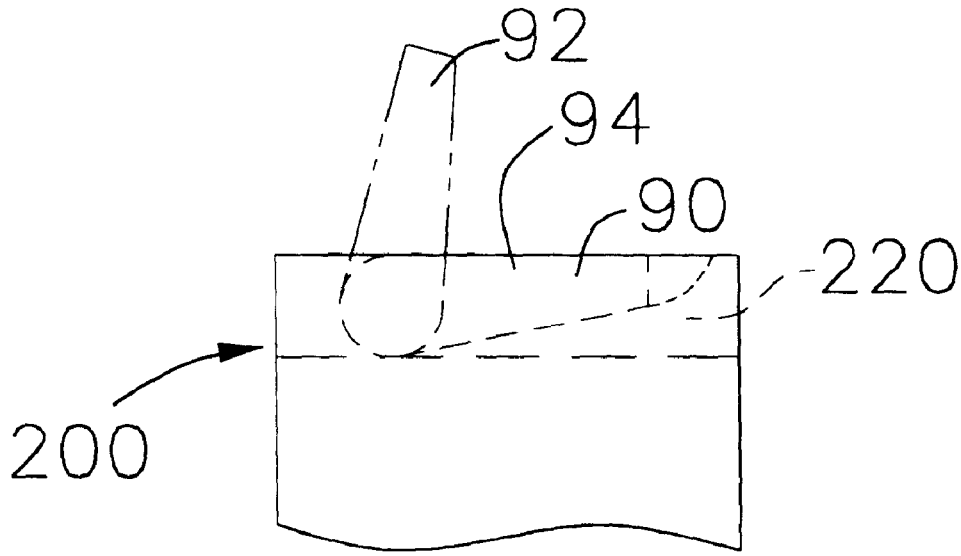
FIG. 9 is a side view of a cap having a moveable spout.

Moreover, any of the aforementioned embodiments may be incorporated in non-conventional caps, such as caps having a flip top or a moveable spout. With flip caps 100, the top 120 of the cap is hingedly connected to the annular wall or rim 126 of the cap (FIG. 8). In this regard, the top can be flipped open to allow for the pouring out of the contents of the bottle. With spout caps 200, a spout 90 is incorporated on the cap top portion 220 of the cap 200 (FIG. 9). The spout can be rotated from a closed position 90 to an open position 92. When in an open position, a path is provided allowing for the pouring out of the contents of the bottle. With either type of cap, the ridges or grooves are also formed on the inner surface of the cap top portion as described herein.

Furthermore, the ridges or grooves may be formed, preferably by a molding or a machining process, on a disc 300 made from a hard or semi-hard material such as plastic (FIGS. 10,11,12,13 and 14). The disc is sized such that it can fit and sit against the inner surface 46 of the cap top portion 24 and such that the ridges 344 (FIGS. 11,12 and 14) or grooves 376 (FIG. 14) can mate with the bottle neck rim 42 which defines the bottle mouth 40 as described above. In this regard the disc may be used with conventional caps to provide the necessary venting so as to prevent bottle paneling. Moreover, since the disc is made from a hard or semi-hard material, the risk of collapsing of the ridges of grooves which may prevent the venting of gases is decreased. The thickness of the disc should preferably be in the order of 0.030 inch. The disc may be glued to the inner surface of the cap top portion using an adhesive compatible with the contents of the bottle.

Figure 10:
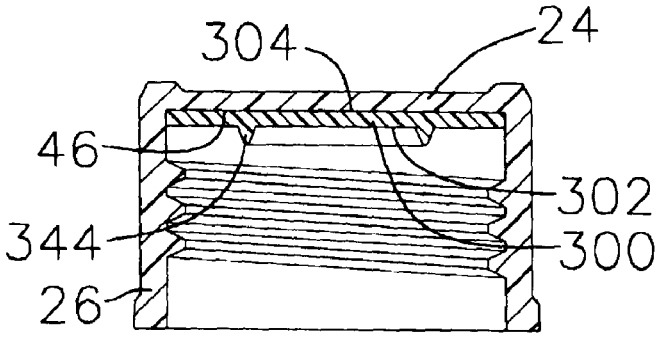
FIG. 10 is a cross-sectional view of cap fitted with a disc according one embodiment of the present invention.
Figure 11:
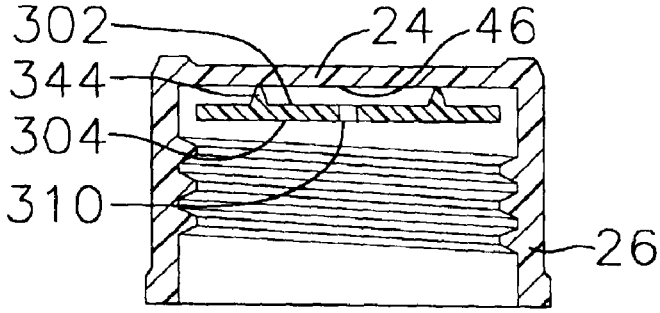
FIG. 11 is a cross-sectional view of cap fitted with a disc according to an alternate embodiment of the present invention.
Figure 12:
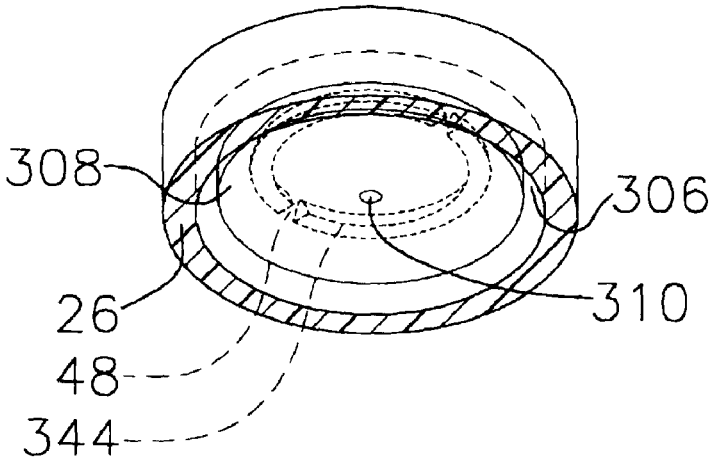
FIG. 12 is a top view of the cap with disc of the embodiment show in FIG. 11.
Figure 13:
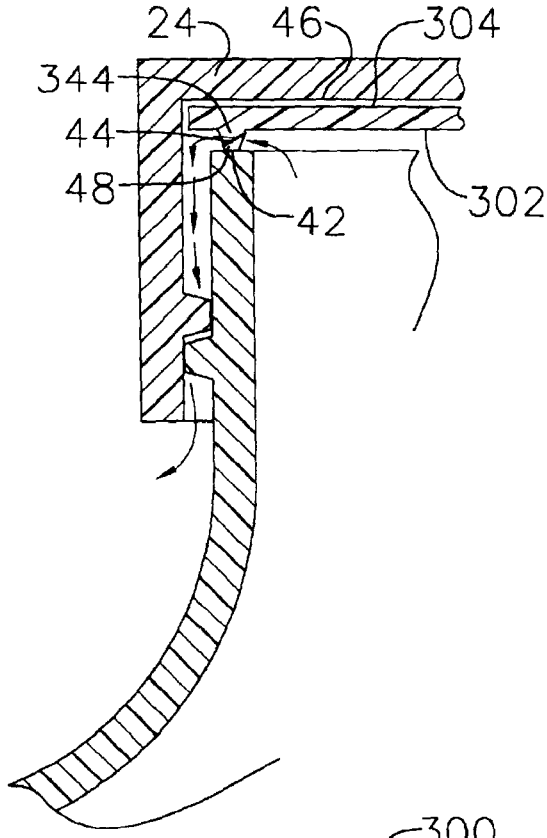
Figure 14:
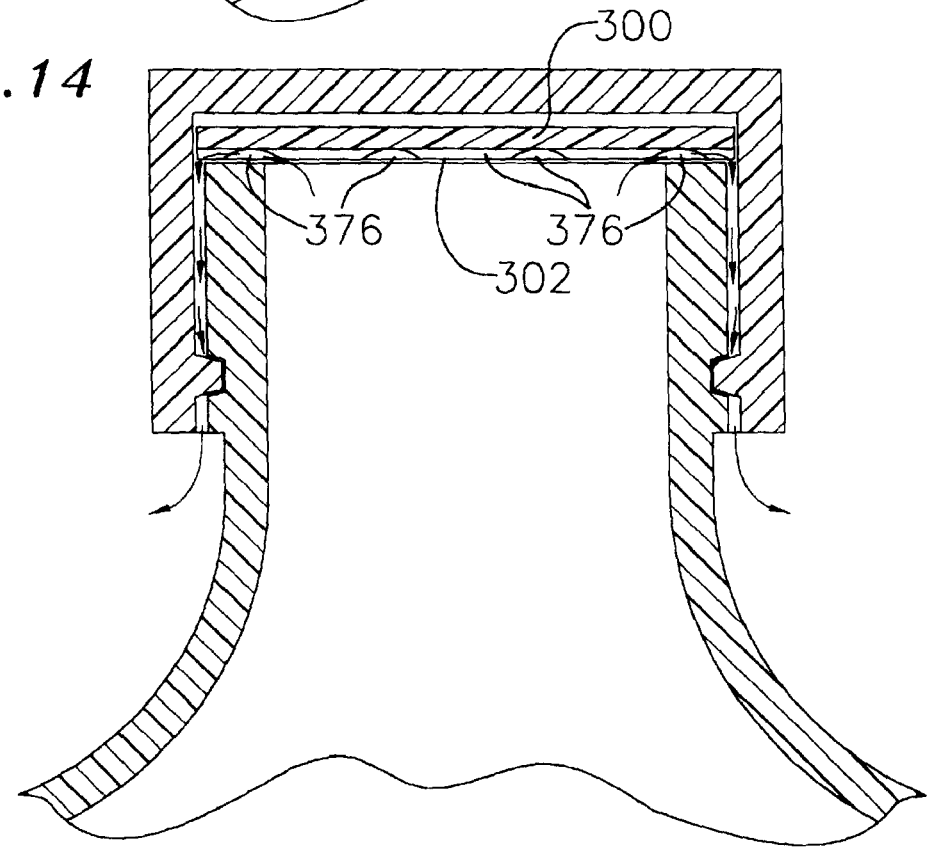
FIG. 14 is a partial cross sectional view of a cap threaded on a bottle neck and sandwiching there between a disk having a plurality of grooves which extend beyond the rim of the bottle neck.

The ridges 44 or grooves 376 are formed on one surface 302 of the disc, with the opposite surface 304 being flat (FIGS. 10,11,12 and 14). In one embodiment, the disc can he mated to the cap with its flat surface 304 against the cap top portion 24 inner surface 46 (FIGS. 10 and 13). In another embodiment, the disc is mated to the cap with its ridged or grooved surface 302 against the inner surface 46 of the cap top portion (FIG. 11). With this embodiment, the flat surface side of the disc mates with the bottle mouth when the cap is torqued onto the bottle. Moreover, with this embodiment, the diameter of the disc should be smaller then the inner diameter of the cap annular wall 26 such that a gap 306 is defined between the annular wall 26 and the disc edge 308. An opening 310 is formed through the thickness of the disc to allow the gases generated in the bottle to travel from the bottle through the opening and to the grooved or ridged surface 302 of the disc. From there the gas travels in the grooves or through the slots in the ridges and through the gap and through to the threaded space 52 (FIG. 3) between the cap annular wall inner surface and the bottle neck outer surface.

With this latter embodiment, i.e., the embodiment where the ridged surface is mated to the inner surface of the cap top portion, the ridges act as a spacer to separate the disc from the inner surface of the cap top portion. Moreover, with this embodiment, to prevent the bending of the disc when the cap is threaded onto the bottle, the disc should be positioned such that a ridge is located over the bottle neck rim 42.

What is claimed is:

1. A bottle cap for capping a bottle having a mouth having a rim *wherein a radius extends from a center of the mouth to an outer perimeter of the rim*, the cap comprising:

a top portion having an inner surface;

an annular wall extending from the top portion;

a plurality of concentric circular ridges formed on the top portion inner surface for [registering with] *engaging* the rim *along the radius*; and at least a slot formed across each of said plurality of ridges *for defining a pathway across the rim when the concentric circular ridges are engaged with the rim, wherein each a slot in each ridge is radially aligned with a slot in a consecutive ridge for defining a single radial slot across said consecutive ridges*.

[2. A bottle cap as recited in claim 1 comprising, wherein at least one slot is formed across all the ridges.]

[3. A bottle cap as recited in claim 1 wherein a slot in each ridge is aligned with a slot in a consecutive ridge for defining a single slot across said consecutive ridges.]

4. A bottle cap as recited in claim 1 wherein [the] *a* slot formed across one ridge is circumferentially spaced apart from a slot formed across an adjacent ridge.

5. A bottle cap as recited in claim 1 further comprising a liner fitted over the top portion inner surface, the liner having an opening formed through the liner thickness.

6. A bottle cap as recited in claim 1 wherein the top portion is hingedly coupled to the annular wall.

7. A bottle cap as recited in claim 1 further comprising a moveable spout extending from the top portion.

[8. A bottle cap comprising:

a top portion having an inner surface;

an annular wall extending from the top portion; and a groove formed on the inner surface of the top portion said groove extending chordwise from a first point adjacent the annular wall to a second point adjacent the annular wall.]

[9. A bottle cap as recited in claim 8 comprising a plurality of grooves formed on the inner surface of the top portion.]

10. A bottle cap comprising:

a top portion having an inner surface;

an annular wall extending from the top portion;

a first set of parallel spaced apart grooves formed on the inner surface of the top portion; and a second set of parallel spaced apart grooves formed on the inner surface of the top portion, wherein grooves of the first set intersect grooves of the second set.

[11. A bottle cap comprising:

a top portion having an inner surface;

an annular wall extending from the top portion;

a plurality of grooves formed on the inner surface of the top portion; and a liner fitted over the top portion inner surface, the liner having an opening formed through its thickness.]

[12. A bottle cap as recited in claim 8 wherein the top portion is hingedly coupled to the annular wall.]

[13. A bottle cap as recited in claim 8 further comprising a moveable spout extending from the top portion.]

14. A vented bottle cap system comprising:

a bottle having a neck having a rim defining a mouth and threads formed on the neck outer surface;

*wherein a radius extends from a center of said mouth to an outer perimeter of said rim;* a cap having a top portion having an inner surface and an annular wall extending from the top portion, the annular wall having threads formed on its inner surface for threading onto the threads formed on the bottle neck, wherein when the cap is threaded onto the bottle neck a gas path is formed between the outer surface of the bottle neck and the inner surface of the annular wall;

a plurality of concentric circular ridges formed on the inner surface of the top portion; and a slot formed across each of said plurality of ridges, wherein when the cap is *completely* threaded onto the bottle neck, *each of* the *plurality of* ridges [sit on] *engages* the bottle neck rim, *wherein the bottle neck rim*

*is engaged by all of said plurality of ridges along a majority of a circumferential length of the bottle neck rim,* and *wherein* the slots define a pathway for gas generated in the bottle to escape across the bottle neck rim and through the pathway, *wherein said majority of a circumferential length may be a non-continuous circumferential length.*

15. A vented bottle cap system as recited in claim 14 wherein a slot in each ridge is radially aligned with a slot in an adjacent ridge.

16. A vented bottle cap system as recited in claim 14 wherein a slot in each ridge is circumferentially spaced apart from a slot in an adjacent ridge.

17. A vented bottle cap system as recited in claim 14 further comprising a liner fitted in the cap and having a hole through its thickness, wherein when the cap is threaded onto the bottle neck, the liner sits on the bottle neck rim and wherein gases generated in the bottle escape through the hole, through the slot and through the pathway.

[18. A vented bottle cap system comprising:

a bottle having a neck having a rim defining a mouth and threads formed on the neck outer surface;

a cap having a top portion having an inner surface and an annular wall extending from the top portion, the annular wall having threads formed on its inner surface for threading onto the threads formed on the bottle neck, wherein when the cap is threaded onto the bottle neck a gas path is formed between outer surface of the bottle neck and the inner surface of the annular wall; and a groove formed on the inner surface of the top portion wherein when the cap is threaded onto the bottle neck, the groove extends outwardly beyond two locations of the rim of the bottle neck providing a pathway for gas generated in the bottle to escape across the bottle neck mouth and through the gas path.]

[19. A vented bottle cap system as recited in claim 18 comprising a plurality of grooves formed on the inner surface of the top portion, wherein each groove extends radially beyond the rim of the bottle neck when the cap is threaded onto the bottle neck.]

[20. A vented bottle cap system as recited in claim 19 comprising a first set of parallel grooves and a second set of parallel grooves formed on the inner surface of the top portion, wherein grooves of the first set intersect grooves of the second set.]

[21. A vented bottle cap system as recited in claim 18 further comprising a liner fitted in the cap and having a hole through its thickness, wherein when the cap is threaded onto the bottle neck, the liner sits on the bottle neck rim and wherein gases generated in the bottle escape through the hole, through the groove and through the gas path.]

22. A method for venting gases generated in a bottle having a rim defining a mouth and containing a liquid, *wherein a radius extends from a center of said mouth to an outer perimeter of said rim,* the method comprising the steps of:

providing a cap having a top portion, a plurality of circular ridges formed on an inner surface of the top portion and a slot formed across each of said plurality of ridges; and torquing the cap on the bottle causing the plurality of ridges to [sit on] *engage and press against an upper surface of* the rim, *wherein all of said plurality of ridges engage the upper surface of the rim along a majority of a circumferential length of the upper surface of the rim,* wherein the plurality of slots provide a pathway for the venting of gases, *and wherein said majority of a circumferential length may not be continuous.*

23. A method as recited in claim 22 further comprising [the steps of]:

*venting gas in the bottle through at least one of the slots;* forcing liquid in the slot *after venting*; and solidifying the liquid to block the pathway through at least one of said slots.

[24. A method for venting gases generated in a bottle having a rim defining a mouth and containing a liquid the method comprising the steps:

providing a cap having a top portion and a groove formed on an inner surface of the top portion; and torquing the cap on the bottle causing the inner surface of the top portion to sit on the rim, wherein the groove extends outwardly beyond two locations of the rim and provides a pathway for the venting of gases.]

[25. A method as recited in claim 24 further comprising the steps of:

forcing liquid in the groove; and solidifying the liquid to block the pathway through the groove.]

[26. A vented bottle cap system comprising:

a bottle having a neck having a rim defining a mouth and threads formed on the neck outer surface;

a cap having a top portion having an inner surface and an annular wall extending from the top portion, the annular wall having threads formed on its inner surface for threading onto the threads formed on the bottle neck, wherein when the cap is threaded onto the bottle neck a gas path is formed between outer surface of the bottle neck and the inner surface of the annular wall;

a disc made of a material being at least semi hard fitted over the top portion inner surface, the disc having a first surface opposite a second surface, wherein the first surface faces the top portion inner surface;

a circular ridge formed on the second surface of the disc; and a slot formed across the ridge, wherein when the cap is threaded onto the bottle neck, the ridge sits on the bottle neck rim and the slot forms a pathway for gas generated in the bottle to escape across the bottle neck rim and through the gas path.]

27. A vented bottle cap system [as recited in claim 26] comprising:

*a bottle having a neck having a rim defining a mouth and threads formed on the neck outer surface, wherein a radius extends from a center of the mouth to an outer perimeter of the rim;*

*a cap having a top portion having an inner surface and an annular wall extending from the top portion, the annular wall having threads formed on its inner surface for threading onto the threads formed on the bottle neck, wherein when the cap is threaded onto the bottle neck a gas path is formed between the outer surface of the bottle neck and the inner surface of the annular wall;*

*a disc made of a material being at least semi-hard fitted over the top portion inner surface, the disc having a first surface opposite a second surface, wherein the first surface faces the top portion inner surface; and* a plurality of concentric ridges formed [in] *on* the second surface of the disc, wherein when the cap is *completely* threaded onto the bottle neck, the plurality of ridges contact the bottle neck rim, *wherein the bottle neck rim is contacted by all of said plurality of concentric ridges along a majority of a circumferential length of said rim, and wherein a majority of the circumferential length may not be continuous*; and at least a slot in each ridge.

28. A vented bottle cap system as recited in claim 27 wherein at least a slot in each ridge is radially aligned with a slot in an adjacent ridge.

[29. A vented bottle cap system as recited in claim 26 further comprising a liner fitted in the cap over the disc and having a hole through its thickness, wherein when the cap is threaded onto the bottle neck, the liner is sandwiched between the ridge and the rim and wherein gases generated in the bottle escape through the hole, through the slot and through the gas path.]

30. A vented bottle cap system as recited in claim [26] *27* wherein the disc is made from plastic.

31. A vented bottle cap system comprising:

a bottle having a neck having a rim defining a mouth and having threads formed on the bottle neck outer surface;

a cap having a top portion having an inner surface and an annular wall extending from the top portion, the annular wall having threads formed on its inner surface for threading onto the threads formed on the bottle neck outer surface, wherein when the cap is threaded onto the bottle neck a gas path is formed between outer surface of the bottle neck and the inner surface of the annular wall;

a disc made of a material being at least [semi hard] *semi-hard* fitted over the top portion inner surface, the disc having a first surface opposite a second surface, wherein the first surface faces the top portion inner surface; and a first set of parallel grooves and a second set of parallel grooves formed on the second surface of the disc, wherein grooves of the first set intersect grooves of the second set, wherein when the cap is threaded onto the bottle neck, the grooves extend radially beyond the rim of the bottle neck providing pathways for gas generated in the bottle to escape across the bottle neck mouth.

[32. A vented bottle cap system comprising:

a bottle having a neck having a rim defining a mouth and threads formed on the neck outer surface;

a cap having a top portion having an inner surface and an annular wall extending from the top portion, the annular wall having threads formed on its inner surface for threading onto the threads formed on the bottle neck outer surface, wherein when the cap is threaded onto the bottle neck a gas path is formed between the outer surface of the bottle neck and the inner surface of the annular wall;

a disc made from a material being at least semi hard fitted over the top portion inner surface, the disc having a circumferential edge and a first surface opposite a second surface, wherein the first surface faces the top portion inner surface;

a gap between the annular wall and the circumferential edge;

an opening formed through the thickness of the disc, the opening located within the bottle mouth when the cap is threaded onto the bottle neck;

a circular ridge formed on the first surface of the disc; and a slot formed across the ridge, wherein when the cap is threaded onto the bottle neck, the ridge is located over the bottle neck rim and the opening and slot form a pathway for gas generated in the bottle to escape across the bottle neck and through the gas path.]

[33. A bottle cap liner disc for use with a cap for capping a bottle having a rim defining a bottle mouth and having an inner and an outer diameter, the disc allowing for the venting of gases generated in a bottle when the cap is threaded on the bottle, the disc comprising:

a first surface opposite a second surface and a thickness therebetween;

an opening formed through the thickness;

a circular ridge formed on the first surface of the disc; and a slot formed across the ridge.]

[34. A bottle cap liner disc for use with a cap for capping a bottle having a rim defining a bottle mouth and having an inner and an outer diameter, the disc allowing for the venting of gases generated in a bottle when the cap is threaded on the bottle, the disc comprising:

a first surface opposite a second surface; and a plurality of concentric circular ridges formed on the first surface of the disc; and a slot formed across each of said plurality of ridges.]

[35. An insert having an annular section for use with a cap for capping a bottle having a rim defining a bottle mouth and having an inner and an outer diameter, the insert allowing for the venting of gases generated in a bottle when the cap is threaded on the bottle, the disc defining a central opening and comprising:

a first surface opposite a second surface;

a circular ridge formed on the first surface of the annular section; and a slot formed across the ridge.]

[36. An insert as recited in claim 35 comprising a plurality of concentric circular ridges and a slot formed across each of said plurality of ridges.]

[37. A vented bottle cap system comprising:

a bottle having a neck having a rim defining a mouth and threads formed on the neck outer surface;

a cap having a top portion having an inner surface and an annular wall extending from the top portion, the annular wall having threads formed on its inner surface for threading onto the threads formed on the bottle neck, wherein when the cap is threaded onto the bottle neck a gas path is formed between outer surface of the bottle neck and the inner surface of the annular wall;

a venting member having an annular section having a central opening and made of a material being at least semi hard, the annular section having a first surface opposite a second surface and sandwiched between the cap inner surface and the rim wherein the first surface faces the cap top portion inner surface;

a circular ridge formed on the first surface of the annular section; and a slot formed across the ridge, wherein when the cap is threaded onto the bottle neck, the slot forms a pathway for gas generated in the bottle to escape through the opening and across the bottle neck rim and through the gas path.]

[38. A vented bottle cap system as recited in claim 37 comprising:

a plurality of concentric ridges formed in the first surface of the annular section; and at least a slot in each ridge.]

[39. A vented bottle cap system as recited in claim 38 wherein at least a slot in each ridge is radially aligned with a slot in an adjacent ridge.]

[40. A vented bottle cap system as recited in claim 37 therein the insert is made from plastic.]

*41. A bottle cap as recited in claim 1 wherein said cap top portion inner surface is a surface of an insert inserted against the cap top portion.*

*42. A bottle cap as recited in claim 14 wherein said cap top portion inner surface is a surface of an insert inserted against the cap top portion.*

*43. A vented bottle cap system comprising:*

*a bottle having a neck having a rim defining a mouth and threads formed on the neck outer surface;*

*wherein a radius extends from a center of said mouth to an outer perimeter of said rim;*

*a cap having a top portion having an inner surface and an annular wall extending from the top portion, the annular wall having threads formed on its inner surface for threading onto the threads formed on the bottle neck, wherein when the cap is threaded onto the bottle neck a gas path is formed between the outer surface of the bottle neck and the inner surface of the annular wall;*

*a plurality of concentric circular ridges formed on the inner surface of the top portion; and*

*a slot formed across each of said plurality of ridges, wherein when the cap is completely threaded onto the bottle neck, the plurality of ridges engage the bottle neck along said radius and the slots define a pathway for gas generated in the bottle to escape across the bottle neck rim and through the pathway, wherein a slot in each ridge is radially aligned with a slot in an adjacent ridge.*

*44. A vented bottle cap system comprising:*

*a bottle having a neck having a rim defining a mouth and threads formed on the neck outer surface, wherein a radius extends from a center of the mouth to an outer perimeter of the rim;*

*a cap having a top portion having an inner surface and an annular wall extending from the top portion, the annular wall having threads formed on its inner surface for threading onto the threads formed on the bottle neck, wherein when the cap is threaded onto the bottle neck a gas path is formed between the outer surface of the bottle neck and the inner surface of the annular wall;*

*a disc made of a material being at least semi-hard fitted over the top portion inner surface, the disc having a first surface opposite a second surface, wherein the first surface faces the top portion inner surface; and*

*a plurality of concentric ridges formed on the second surface of the disc, wherein when the cap is completely threaded onto the bottle neck, the plurality of ridges contact the bottle neck rim and along the radius; and*

*at least a slot in each ridge, wherein at least a slot in each ridge is radially aligned with a slot in an adjacent ridge.*

*45. A vented bottle cap system comprising:*

*a bottle having a neck having a rim defining a mouth and threads formed on the neck outer surface;*

*a cap having a top portion having an inner surface and an annular wall extending from the top portion, the annular wall having threads formed on its inner surface for threading onto the threads formed on the bottle neck, wherein when the cap is threaded onto the bottle neck a gas path is formed between the outer surface of the bottle neck and the inner surface of the annular wall; and*

*a first set of parallel grooves and a second set of parallel grooves formed on an inner surface of the top portion, wherein grooves of the first set intersect grooves of the second set providing a pathway for gas generated in the bottle to escape across the bottle neck mouth and through the gas path.*

* * * * *

UNITED STATES PATENT AND TRADEMARK OFFICE

CERTIFICATE OF CORRECTION

PATENT NO. : RE42,910 E
APPLICATION NO. : 09/995483
DATED : November 15, 2011
INVENTOR(S) : Pearce It is certified that error appears in the above-identified patent and that said Letters Patent is hereby corrected as shown below:

In the Claims

Column 7, Claim 22, line 55. Delete "comprising the steps of:"

Insert -- comprising: --

Column 9, Claim 31, line 21. After "between"

Insert -- the --

Signed and Sealed this
Third Day of July, 2012

David J. Kappos

David J. Kappos
*Director of the United States Patent and Trademark Office*